US012076842B2

(12) United States Patent
James

(10) Patent No.: US 12,076,842 B2
(45) Date of Patent: Sep. 3, 2024

(54) EXPANDABLE DEVICE, APPARATUS AND ASSEMBLY FOR PUSHING APART OPPOSED SURFACES

(71) Applicant: Workplace Maintenance Solutions Pty Ltd, Riddells Creek (AU)

(72) Inventor: Allan Martin James, Riddells Creek (AU)

(73) Assignee: Workplace Maintenance Solutions Pty Ltd, Riddells Creek (AU)

( * ) Notice: Subject to any disclaimer, the term of this patent is extended or adjusted under 35 U.S.C. 154(b) by 456 days.

(21) Appl. No.: 16/978,455

(22) PCT Filed: Mar. 7, 2019

(86) PCT No.: PCT/AU2019/000031
§ 371 (c)(1),
(2) Date: Sep. 4, 2020

(87) PCT Pub. No.: WO2019/169426
PCT Pub. Date: Sep. 12, 2019

(65) Prior Publication Data
US 2021/0039237 A1    Feb. 11, 2021

(30) Foreign Application Priority Data
Mar. 7, 2018   (AU) ................................ 2018900736

(51) Int. Cl.
  *B25B 27/00*  (2006.01)
  *B25B 27/02*  (2006.01)
  (Continued)

(52) U.S. Cl.
  CPC ........ *B25B 27/026* (2013.01); *B25B 27/0035* (2013.01); *B25B 27/16* (2013.01);
  (Continued)

(58) Field of Classification Search
  CPC ...... B66F 3/24; B66F 3/00; B66F 3/10; B25B 27/00
  See application file for complete search history.

(56) References Cited

U.S. PATENT DOCUMENTS 3,901,356 A    8/1975 Butler
6,244,568 B1 *  6/2001 Patton ................... A62B 3/005
                                                254/93 H
(Continued)

FOREIGN PATENT DOCUMENTS

WO    2019169426 A1    9/2019

OTHER PUBLICATIONS

International Application Serial No. PCT/AU2019,000031, Search Report and Written Opinion mailed Apr. 17, 2019, 13 pgs.
(Continued)

*Primary Examiner* — Lee D Wilson
(74) *Attorney, Agent, or Firm* — Polygon IP, LLP

(57) ABSTRACT

The invention relates to an expandable device adapted to forcibly separate spaced components having generally parallel opposed surfaces defining a cavity therebetween, the expandable device having a jaw assembly with a pair of opposing jaws and actuating mechanism for opening the jaws, the actuating mechanism including a separating member configured to be driven between the jaws so as to push apart the jaws such that the jaws are openable between a contracted configuration where the jaws are receivable in the cavity to an expanded configuration where the jaws are forced apart by the actuating mechanism such that the outwardly directed surfaces of the jaws are engageable with the opposed surfaces and exert oppositely directed forces thereon. The invention also relates to an apparatus configured to carry at least one the expandable device, and an assembly comprising two of the apparatus.

18 Claims, 5 Drawing Sheets

(51) Int. Cl.
  *B25B 27/16*     (2006.01)
  *B25B 28/00*     (2006.01)
  *B60T 17/22*     (2006.01)
  *F16D 65/00*     (2006.01)

(52) U.S. Cl.
  CPC ............ *B25B 28/00* (2013.01); *B60T 17/221* (2013.01); *F16D 65/0043* (2013.01)

(56) References Cited

U.S. PATENT DOCUMENTS

| | | | |
|---|---|---|---|
| 7,568,372 B1* | 8/2009 | Patton | A62B 3/005 |
| | | | 72/464 |
| 8,505,877 B2* | 8/2013 | Strohmeier | A62B 3/005 |
| | | | 72/392 |
| 11,311,751 B2* | 4/2022 | Dobashi | F15B 21/001 |
| 2005/0177988 A1* | 8/2005 | Williams | B25B 27/064 |
| | | | 29/252 |
| 2010/0236044 A1 | 9/2010 | Bearman | |
| 2011/0277297 A1 | 11/2011 | Rich et al. | |
| 2014/0103277 A1 | 4/2014 | Cormack | |
| 2021/0039237 A1* | 2/2021 | James | B25B 27/026 |

OTHER PUBLICATIONS

Australian Application Serial No. 2019230442, Office Action mailed Jan. 5, 2024, 3 pgs.
European Application Serial No. 19764754.8, Search Report mailed Sep. 11, 2021, 9 pgs.

\* cited by examiner

EXPANDABLE DEVICE, APPARATUS AND ASSEMBLY FOR PUSHING APART OPPOSED SURFACES

CROSS-REFERENCE TO RELATED APPLICATIONS

The present application is the U.S. national phase of PCT application No. PCT/AU2019/000031 filed on 7 Mar. 2019, which claims priority from Australian provisional patent application No. 2018900736 filed on 7 Mar. 2018, the entire contents of both applications are incorporated herein by reference.

TECHNICAL FIELD

The present invention relates to an expandable device, apparatus and assembly adapted to forcibly separate components with spaced-apart opposed surfaces. The invention may find particular application in automotive maintenance, for example, including for use in disassembling hub and brake rotor components.

BACKGROUND

Metal automotive assemblies, such as brake assemblies in-situ are often difficult to separate for inspection, removal and servicing especially if there has been sustained use and/or corrosion.

In particular, inspection, removal and servicing of disc brake hub and rotor assemblies for heavy vehicles can be difficult and time-consuming as the used hub and rotor assemblies are often seized and do not separate easily. Furthermore, the hub and rotor assemblies can be bound together by corrosion especially if heavy vehicles are used on salted roads during winter. Current methods for separating these hub and rotor assemblies include cutting the rotor by an angle grinder, breaking the rotor with a hammer or separating the assembly with the use of a hydraulic press, which can be destructive and result in the violent separation of the components or parts thereof. All such methods are time-consuming, inconvenient and costly due to the manual labour required and as rotor and hub assemblies for a heavy vehicle can weigh in excess of 100 kg, there are also health and safety concerns for the service technicians.

SUMMARY

According to a first aspect of the present invention, there is provided an expandable device adapted to forcibly separate spaced components having generally parallel opposed surfaces defining a cavity therebetween, the expandable device having a jaw assembly with a pair of opposing jaws and actuating means for opening the jaws, the actuating means including a separating member configured to be driven between the jaws so as to push apart the jaws such that the jaws are openable between a contracted configuration where the jaws are receivable in the cavity to an expanded configuration where the jaws are forced apart by the actuating means such that the outwardly directed surfaces of the jaws are engageable with the opposed surfaces and exert oppositely directed forces thereon.

The separating member may have a pair of inclined surfaces associated with inwardly directed surfaces of the jaws, each inwardly directed surface being correspondingly inclined and generally parallel to its associated inclined surface of the separating member, wherein, when the separating member is movable laterally between the inner surfaces of the jaws, the inclined surfaces of the separating member are slidable along the inclined inwardly directed surfaces thereby pushing the jaws apart.

In embodiments, the separating member is in the form of a wedge.

The jaw assembly may have a pair of elongate members having opposing ends, the jaws being defined by first end portions thereof and being pivotally connected at opposing second end portions such that the jaws are movable between the contracted and expanded configurations.

According to an embodiment, the jaws may be pivotally biased towards each other.

According to an embodiment, each of the opposed surfaces is a surface of one of least two assembled components, such that pushing apart the opposed surfaces effects separation of the components.

According to an embodiment, the actuating means includes a hydraulically-powered system for driving the separating member.

In a second aspect, the present invention provides an apparatus for pushing apart spaced-apart generally parallel opposed surfaces, the apparatus being configured for carrying at least one expandable device as described above.

According to an embodiment, the apparatus is for pushing apart opposed surfaces of a hub and rotor assembly to effect separation thereof.

According to an embodiment, the apparatus is configured to be received in at least a part of the cavity defined by the spaced-apart opposed surfaces, wherein each of the opposed surfaces is one of a surface of a hub and rotor assembly.

Preferably the apparatus includes a plurality of expandable devices arranged to exert forces at equally spaced locations about the axis of the hub and rotor assembly. According to an embodiment, the apparatus has a frame which carries two expandable devices.

According to an embodiment, the apparatus has least one engagement member for engaging with the hub and rotor assembly.

According to an embodiment, the at least one engagement member is configured for engaging an outer circumferential rim of the rotor.

According to an embodiment, the at least one engagement member is configured for receiving a stud of the hub.

According to an embodiment, the apparatus has at least one handle for assisting a user in moving the apparatus.

According to an embodiment, the apparatus has two handles, wherein the handles extend transverse to each other.

According to a third aspect of the present invention, there is provided an assembly comprising two apparatus as described above.

According to an embodiment, each apparatus is, in use, received in opposite sides of the cavity such that the oppositely directed forces exerted by the expandable devices are distributed substantially across the opposing surfaces for effective separation of the hub and rotor.

According to an embodiment, the apparatus has a frame comprising a pair of arms, each arm for carrying at least one expandable device.

According to an embodiment, the arms are pivotally connected such that they are openable and closable between an open configuration where the arms are adapted to engage or disengage from a heavy brake assembly and a closed configuration wherein, when the apparatus is received in the cavity, the expandable devices having a circumferentially distributed arrangement to provide generally even pressure around the opposed surfaces to provide effective separation thereof.

According to an embodiment, having at least one handle for manipulation between the open and closed configurations.

According to an embodiment, each arm carries two expandable devices.

According to an embodiment, the expandable devices are configured to expand at substantially the same rate.

BRIEF DESCRIPTION OF FIGURES

The present invention is described hereinbelow, by way of non-limiting example only, with reference to the accompanying drawings, in which.

DETAILED DESCRIPTION

Figure 1:
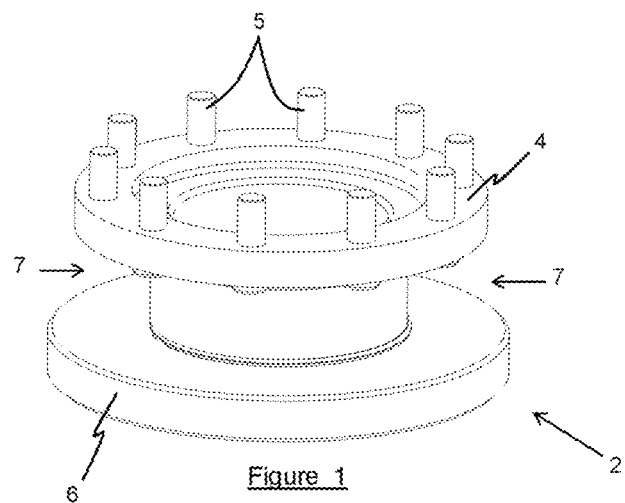
FIG. 1 is a perspective view of a hub and rotor assembly.
Figure 2:
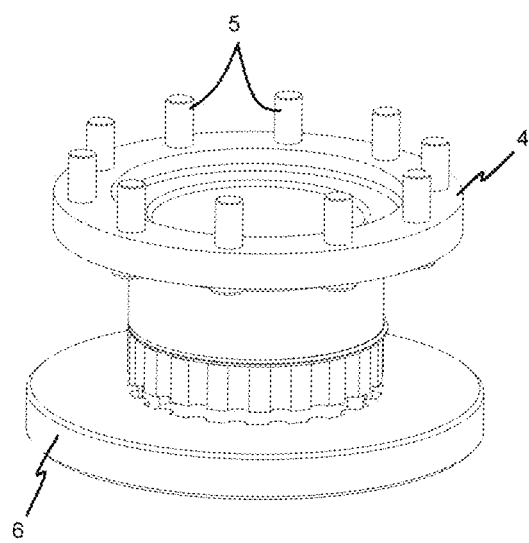
FIG. 2 is a perspective view of the hub and rotor assembly of FIG. 1, where the hub and rotor are separated from each other.

A hub and rotor assembly from a heavy vehicle such as a truck or bus is shown in FIG. 1. The assembly 2 comprises a hub 4 and rotor 6 that are mounted to one another for rotation about a common axis, in use. The hub 4 has a series of studs 5 arranged circumferentially with respect to the rotational axis for attachment to a vehicle wheel. The rotor 6 forms part of the vehicle braking system. For servicing and replacement of worn parts, it is oftentimes necessary to separate the hub from the rotor (as seen in FIG. 2) whilst the assembly 2 is mounted on the vehicle (not shown). However, limited working space and inadequate tools make the task of separating the components difficult, particularly where the hub and rotor have been bound together by corrosion or the like as described above.

When mounted together as seen in FIG. 1, a circumferential cavity 7 exists between surfaces of the hub 4 and rotor 6. Embodiments of this invention as seen in FIGS. 3 to 10 provide an expandable device 8, apparatus 100, 210 and assembly 200 for pushing apart a pair of spaced-apart substantially parallel opposing surfaces, which can be used to exploit the cavity 7 to forcibly separate the hub and rotor whilst in situ on the vehicle. Other applications for the expandable device, apparatus and assembly may also be apparent to those skilled in the art from the disclosure herein.

As illustrated in FIGS. 3 to 10, the preferred embodiments of apparatus 100, 210 and assembly 200 can be used to push apart opposing surfaces of a hub and rotor assembly 2 shown in assembled and separated configurations respectively in FIGS. 1 and 2. Although the apparatus and assembly, which includes one or more expandable devices 8 are shown and described in examples involving heavy brake assemblies, it would be appreciated that the expandable device, apparatus and assembly, particularly the expandable device 8, could be used in a variety of applications, including the automotive, manufacturing or agricultural fields, to separate opposing surfaces, where each opposing surface is a surface of one of two components which have been assembled together and which are generally awkward or difficult to separate manually.

Figure 3:
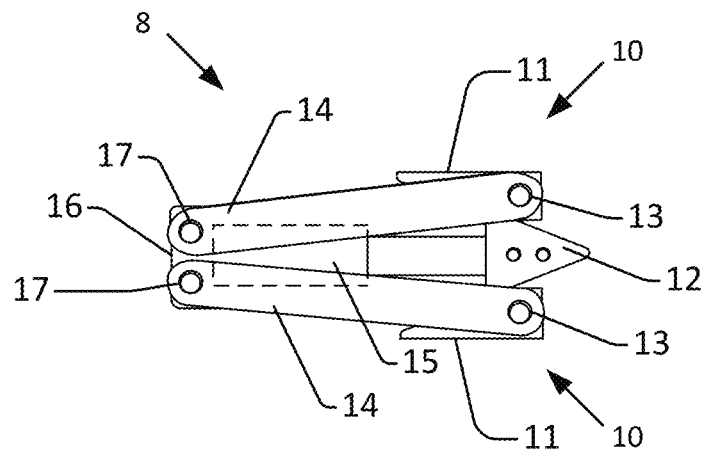
FIG. 3 is a side view of an expandable device for pushing apart opposing surfaces according to an embodiment of the present invention.

Referring to FIG. 3, the expandable device 8 has a jaw assembly having a pair of jaws 10 which are configured to be received in the cavity 7 defined by the opposed surfaces. The jaw assembly has two elongate members 14, the ends of which are pivotally connected side-by-side to and end member 16. The pivotal connections 17 between the elongate members 14 and the end member 16 have parallel pivotal axes such that the opposite ends of the elongate members can pivotally move toward and away from one another and thereby define the pair of jaws 10. The opposite end of each elongate member 14 supports a bearing member 11, pivotally coupled to the respective elongate member at 13. The axes of the pivotal couplings 13 are parallel to the axes of pivotal connections 17.

The expandable device 8 has actuating means for driving the jaws 10 from a contracted configuration in which the elongate members 14 are close to parallel to an expanded configuration in which the two bearing members 11 are increased in separation. In use, in the contracted configuration the bearing members 11 of the jaws 10 can be inserted in the cavity 7 defined by the opposed surfaces. Once received in the cavity 7, the jaws 10 can then be expanded into the expanded configuration such that the outwardly directed surfaces of the bearing members 11 engage with the inwardly opposed surfaces to exert oppositely directed forces thereon to push the opposed surfaces apart. The manner of operation by which the device 8 is driven from the contracted configuration to the expanded configuration is explained below.

The actuating means includes a linear actuator such as a hydraulic cylinder 15 located between the elongate members 14 (obscured portions of the linear actuator 15 are shown in dashed lines in FIG. 3). The linear actuator 15 has one end connected to the end member 16 and has a separating member 12 mounted on the other end. As illustrated particularly in FIG. 3, the separating member 12 is wedge-shaped so as to have a pair of angled surfaces which are adapted to contact respective inwardly directed surfaces of the bearing members 11. Each inwardly directed bearing member surface is correspondingly angled to its associated angled surface of the separating member 12. In operation the separating member 12 is forced between the bearing members 11 by action of the linear actuator, wherein the angled surfaces of the separating member 12 slide along the inwardly angled surfaces of the bearing members thereby driving the jaws 10 open, In other words, force is transmitted by the linear actuator from the end member 16 to the separating member 12 and the angled surfaces of the separating member acting on the bearing members 11 translates the force into expansion of the jaws to provide the oppositely directed forces required to push two components apart. The device 8 may include one or more biasing springs (not seen in the drawings) to urge the jaws toward the contracted configuration against the action of the separating member 12.

The separating member 12, as illustrated in FIG. 3, gradually increases in width from its tip, thereby forming the pair of angled surfaces to form a wedge. The inwardly directed angled surfaces of the bearing members 11 are generally parallel to the associated surfaces of the separating member 12 such that, when the separating member 12 is driven between the bearing members by the linear actuator, the angled surfaces of the separating member and bearing members slide against each other such that expansion of the jaws 10 is smooth and gradual. Advantageously, the expansion of the jaws 10 when providing the oppositely directed forces is without recoil, which prevents any violent separation of components which could be harmful or injurious to the technicians and which may also damage the components.

Although the linear actuator 15 in the embodiments described herein takes the form of a hydraulic cylinder, the means for driving the separating member 12 may be a pneumatic, electrical or hydraulically powered system, such as one or more pneumatic or hydraulic cylinders, and other driving means are also possible. As illustrated in FIGS. 4 to 10, the means for driving the separating member is a hydraulic cylinder 15, the axis of the hydraulic cylinder 15 being generally directed between the elongate members 14 of the jaw assembly.

Embodiments of the present invention that are described hereinbelow are specifically adapted to forcibly separate heavy vehicle rotor and hub assembly components utilising the action of at least one expandable device 8 as described above.

Figure 4:
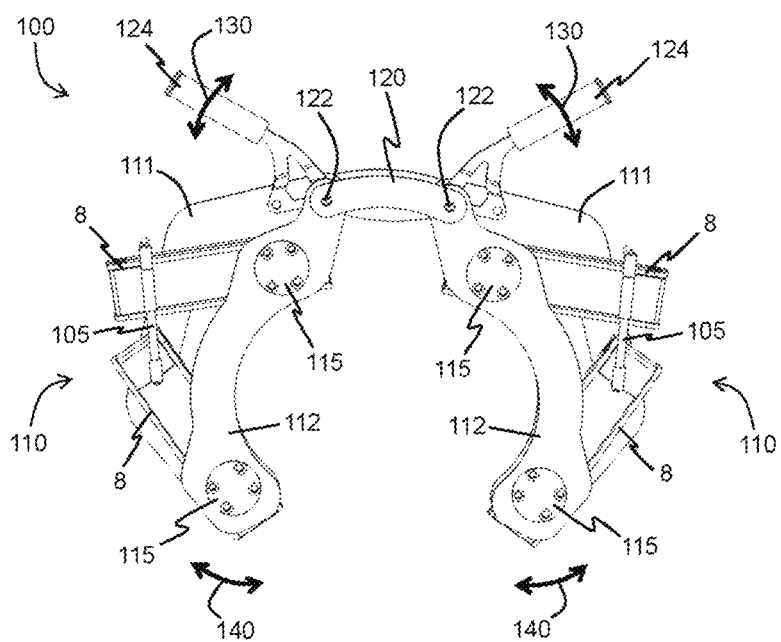
FIG. 4 is a perspective view of an apparatus for pushing apart a hub and rotor assembly according to a second embodiment of the present invention.
Figure 5:
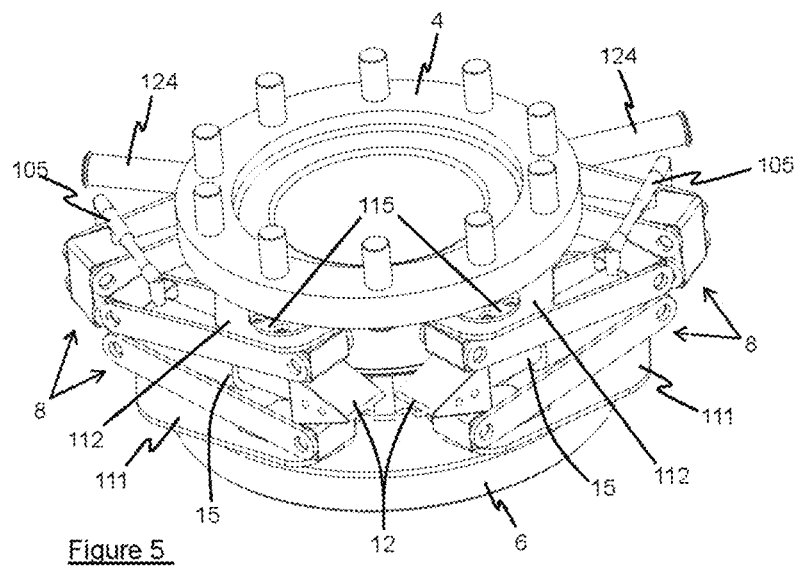
FIGS. 5 and 6 are perspective and front views of the apparatus of FIG. 4 in-situ on a hub and rotor assembly.
Figure 6:
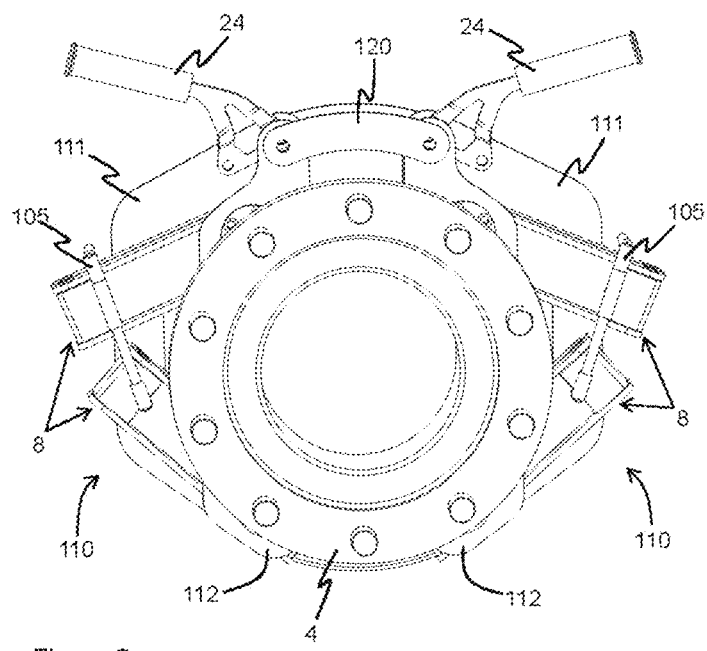
Figure 7:
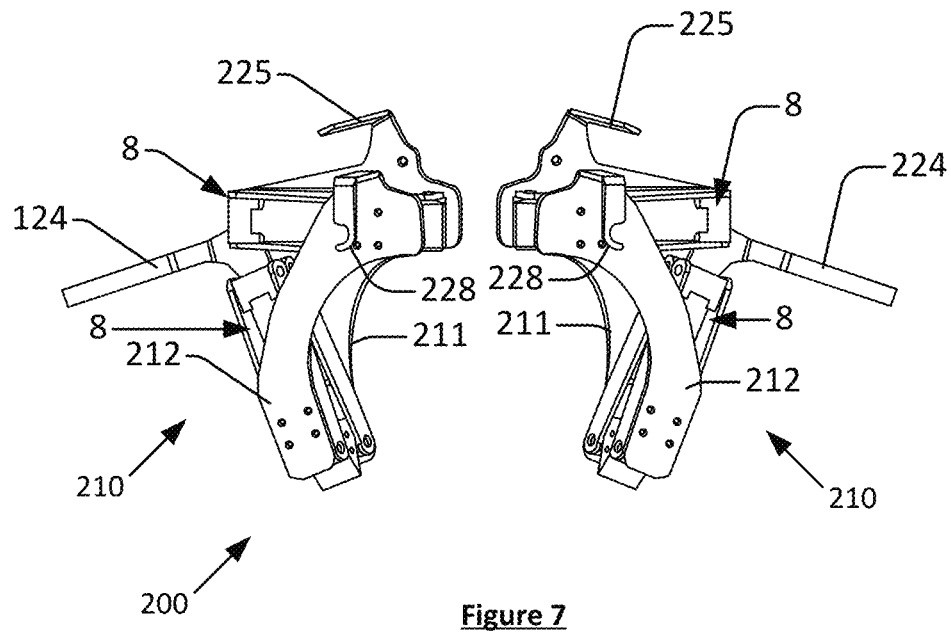
FIG. 7 is a perspective view of an assembly comprising two apparatus for pushing apart a hub and rotor assembly according to a third embodiment of the present invention.

In particular, in the embodiment illustrated in FIGS. 4 to 6, an apparatus 100 has a frame for carrying four expandable devices 8. When the apparatus 100 is positioned in-situ in the cavity 7 defined by the opposed surfaces between the hub and rotor assembly 2, the expandable ends of the devices 8 are positioned approximately equidistant from one another in a circumferential arrangement about the axis of the hub and rotor assembly 2. This allows for the oppositely directed forces provided by the expandable devices 8 to be distributed evenly around the hub and rotor assembly for effective and smooth separation of the hub 4 and rotor 6.

The frame of the apparatus 100 includes a pair of arms 110. The arms 110 each have a pivotal coupling 122 to a link member 120. Each arm 110 carries a pair of expandable devices 8 mounted between first and second frame plates 111, 112. The expandable devices 8 each have respective bearing members 11 attached to the frame plates 111 and 112 whereby operation of the expandable devices forces the frame plates away from one another. Contact plates 115 are provided at the locations of the expandable device bearing members. The pivotal coupling between the arms 110 and link member 120 allows the frame to be opened and closed by pivotal movement of the arms relative to the link member, indicated by arrows 140 in FIG. 4. Each arm 110 has a handle 124 attached to the frame plates to enable manual manipulation of the arms by pivotal action as indicated by arrows 130. Manipulation of the handles effects opening of the frame for placement of the apparatus on a hub and rotor assembly, and for removal of the apparatus therefrom. Once placed on the hub and rotor assembly with the link member uppermost, in the absence of force applied to the handles 124 the arm members will pivot under gravity toward the closed configuration.

When the apparatus 100 is opened, placed on a hub and rotor assembly, and allowed to return to its closed configuration, the frame plates 111, 112 and jaws of the expandable devices 8 are located in the cavity between the hub and rotor positioned such that the jaws 10 of each expandable device 8 are distributed evenly around the rotor/hub axis. As such, the oppositely directed forces provided by each driven separating member 12 via the jaws 10 is applied evenly across the opposing surfaces of the hub and rotor assembly 2 for effective and efficient separation thereof.

FIGS. 5 and 6 show the apparatus 100 mounted to the hub and rotor assembly. In the view shown in FIG. 5 it can be seen that the expandable devices 8 of the apparatus 100 are close to their maximally expanded configuration, although an additional gap between the apparatus 100 and hub 4 is shown for the purposes of illustration.

The expandable devices 8 are arranged to be connected so as to operate simultaneously however it can be appreciated that the expandable devices 8 may be arranged to operate independently if required. As illustrated in FIGS. 4 to 6, the expandable devices 8 on each arm 110 are connected together by hydraulic fluid hoses 105 such that the expandable devices 8 on each arm 110 operate to expand simultaneously and at the same rate. Although not shown in the Figures, the expandable devices 8 on both arms may also be connected so as to driven together. It will be appreciated that the hydraulic cylinders 15 can have connectors (not shown) to which a hydraulic pump may be connected and disconnected such that the apparatus 100 is portable and is easily engageable with the components to be separated.

In the embodiment illustrated in FIGS. 7 to 10, there is shown an assembly 200 for separating components, such as a vehicle hub and rotor assembly by action on a pair of opposed surfaces of the respective components. The assembly 200 comprises two apparatus 210 which are generally the same although in mirror image. Each apparatus 210 is similar to one arm 110 of the preceding embodiment, but the two apparatus 210 are separately mountable rather than being pivotally coupled together. Each apparatus 210 includes a frame comprising a pair of parallel frame plates 211, 212 with two expandable devices 8 mounted therebetween.

The two apparatus 210 are adapted to engage on opposing sides of the hub and rotor assembly cavity. As such, the oppositely directed forces provided by the expandable devices 8 of the two apparatus 210 acting together can be applied evenly around the axis of the hub and rotor assembly for effective and efficient separation of the components.

Advantageously, each of the apparatus 210 carries two expandable devices 8 and thus has a reduced weight in comparison to the apparatus 100 which carries all four expandable devices 8. This may be beneficial to avoid injury to the technicians during transport or use. The apparatus 100 carrying four separation devices is estimated to have a total mass of about 28 kg and therefore each apparatus 210 would be about half that weight and would be more portable, safer and easier to handle by a service technician.

Each apparatus 210 has a pair of handles 224, 225. As exemplified in FIGS. 7 to 10, the handles 224, 225 are defined as elongate portions extending from the frame plate 211 and are arranged such that they extend in mutually transverse orientations for ease of manipulation.

Each apparatus 210 has at least one engagement member 228, 230 for locating and supporting the apparatus 210 on the hub and rotor assembly. In particular, the engagement members 228, 230 are configured to engage with accessible portions of the hub and rotor assembly so as to be supported by the hub and/or rotor. The engagement members 228, 230 can also assist in positioning the apparatus 210 correctly within the cavity 7 between the hub 4 and rotor 6.

Figure 8:
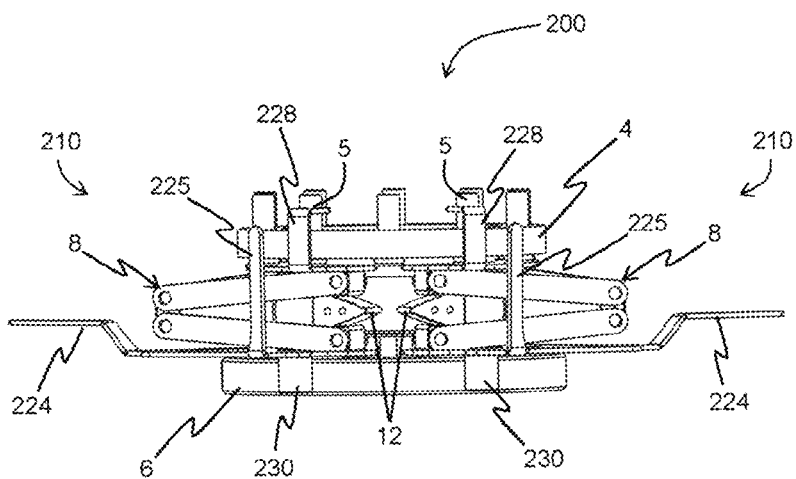
FIG. 8 is a top view of the assembly of FIG. 7 mounted on a hub and rotor assembly.
Figure 9:
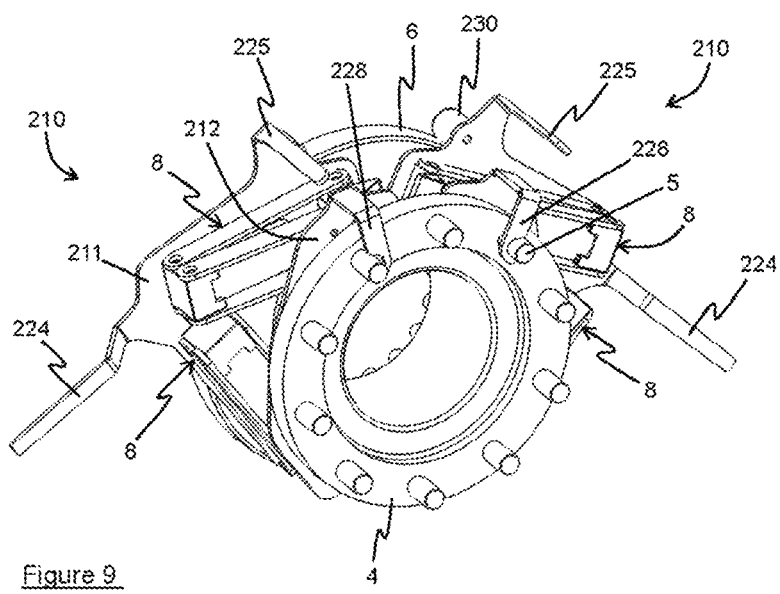
FIGS. 9 and 10 are perspective views of the assembly of FIG. 7 in-situ on a hub and rotor assembly seen from the hub and rotor sides, respectively.

As illustrated more particularly in FIGS. 7 to 10, each apparatus 210 has first and second engagement members 228, 230. The first engagement members 228 are configured to engage with penultimate studs 5 on either side of the upper most stud of the hub when the hub and rotor assembly 2 is in an upright position, as best seen in FIG. 9. Furthermore, the second engagement member 230 is configured to engage with the rotor 6 such that each apparatus 210 is engaged and supported by the outer circumferential rim of the rotor. If the hub and rotor assembly is not in an upright position, for example positioned horizontally such that the axis of the hub 4 is directed upwardly, then the engagement members 228, 230 can act primarily to aid in the correct placement of the assembly 200 in the cavity 7 of the hub and rotor assembly 2.

In the example of FIGS. 7 to 10, the first engagement member 228 is in the form of an inverted U-shaped portion which extends transversely from the top of the frame plate 212. The end of the first engagement member has a hook configured to receive a stud 5.

Figure 10:
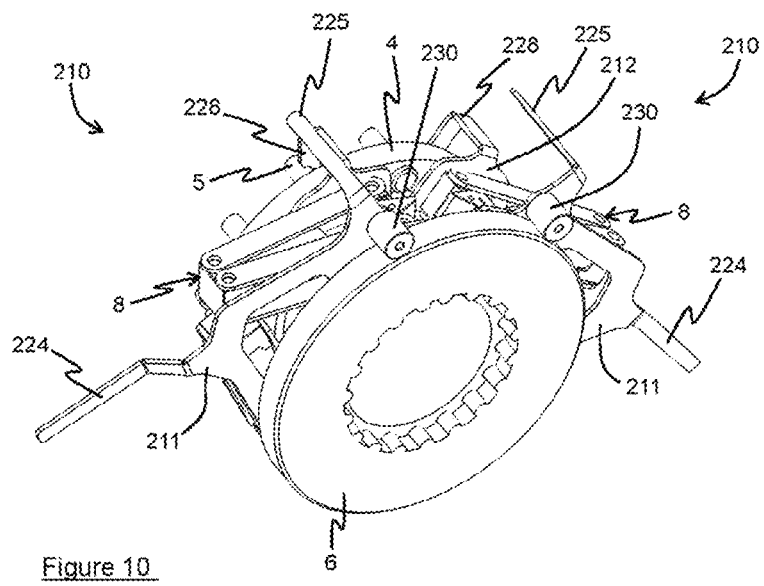

As seen best in FIGS. 8 to 10, the second engagement member 230 is in the form of a roller which is configured to engage with an outer circumferential rim of the rotor 6. The first and second engagement members 228, 230 are thus arranged to be able to support each apparatus 210, thereby forming the assembly 200, on the upper portions of the hub and rotor assembly 2 when it is in an upright position, shown in FIGS. 9 and 10. As such, when the expandable devices 8 are operated the oppositely directed forces provided by the expanding action of both apparatus 210 can be applied evenly around the opposing surfaces of the hub and rotor assembly 102 for effective and efficient separation of the components.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An apparatus for pushing apart spaced-apart generally parallel opposed surfaces of components, the apparatus comprising:
    at least two expandable devices, each expandable device adapted to forcibly separate the spaced apart components having generally parallel opposed surfaces defining a cavity therebetween, each of the expandable devices having a jaw assembly with a pair of opposing jaws and actuating means for opening the jaws, the actuating means including a separating member configured to be driven between the jaws so as to push apart the jaws such that the jaws are openable between a contracted configuration where the jaws are receivable in the cavity to an expanded configuration where the jaws are forced apart by the actuating means such that the outwardly directed surfaces of the jaws are engageable with the opposed surfaces and exert oppositely directed forces on the respective opposed surfaces; and
    wherein the apparatus further comprises a frame comprising a pair of arms, each arm for carrying at least one expandable device wherein the arms are pivotally connected such that they are openable and closable between an open configuration where the arms are adapted to engage or disengage from the cavity and a closed configuration wherein, when the apparatus is received in the cavity, the expandable devices are arranged to provide generally even pressure across the opposed surfaces to provide effective separation of the components.

2. The apparatus according to claim 1, wherein the separating member has a pair of inclined surfaces associated with inwardly directed surfaces of the jaws, each inwardly directed surface being correspondingly inclined and generally parallel to the associated inclined surface of the separating member, wherein, when the separating member is driven between the inner surfaces of the jaws, the inclined surfaces of the separating member are slidable along the inclined inwardly directed surfaces thereby pushing the jaws apart.

3. The apparatus according to claim 1, wherein the separating member is in the form of a wedge.

4. The apparatus according to claim 1, wherein the jaw assembly has a pair of elongate members having opposing ends, the jaws being defined by first end portions thereof and being pivotally connected at opposing second end portions such that the jaws are movable between the contracted and expanded configurations.

5. The apparatus according to claim 4, wherein the jaws are pivotally biased towards each other.

6. The apparatus according to claim 1, wherein each of the opposed surfaces is a surface of one of least two assembled components, such that pushing apart the opposed surfaces effects separation of the components.

7. The apparatus according to claim 1, wherein the actuating means includes a hydraulically-powered system for driving the separating member.

8. The apparatus according to claim 1, being for pushing apart opposed surfaces of a hub and rotor assembly to effect separation of the hub from the rotor.

9. The apparatus according to claim 1, being configured to be received in at least a part of the cavity defined by the spaced-apart opposed surfaces, wherein each of the opposed surfaces is one of a surface of a hub and rotor assembly.

10. The apparatus according to claim 1, having least one engagement member for engaging with the hub and rotor assembly.

11. The apparatus according to claim 10, wherein the at least one engagement member is configured for receiving a stud of the hub.

12. The apparatus according to claim 11, wherein the at least one engagement member is configured for engaging an outer circumferential rim of the rotor.

13. The apparatus according to claim 1, wherein the apparatus has at least one handle for assisting a user in moving the apparatus.

14. The apparatus according to claim 13, having two handles, wherein the handles extend transverse to each other.

15. An assembly comprising two apparatus according to claim 1.

16. The assembly according to claim 15, wherein each apparatus is received in opposite sides of the cavity such that the oppositely directed forces exerted by the expandable devices are distributed substantially across the opposing surfaces for effective separation of the hub and rotor.

17. The apparatus according to claim 1, wherein each arm carries two expandable devices.

18. The apparatus according to claim 1, wherein the expandable devices are configured to expand simultaneously and at substantially the same rate.

\* \* \* \* \*